March 1, 1949.  F. A. GRUETJEN  2,463,102
STATIC BALANCE TESTING APPARATUS
Filed May 17, 1944  4 Sheets-Sheet 1
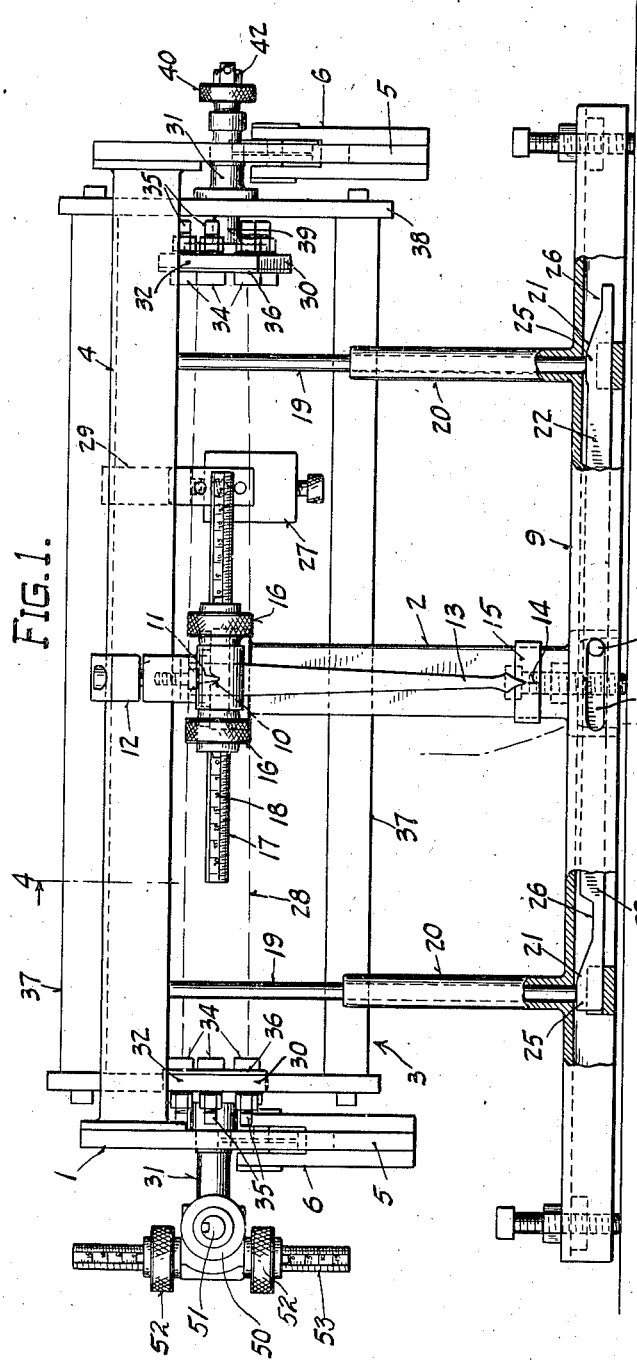
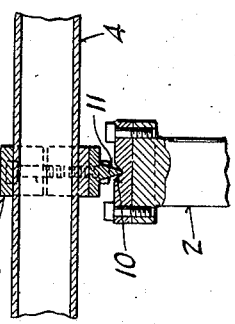
Frederick A. Gruetjen
INVENTOR.
BY
ATTORNEY.

March 1, 1949.　　　　F. A. GRUETJEN　　　　2,463,102
STATIC BALANCE TESTING APPARATUS
Filed May 17, 1944　　　　　　　　　　　　　4 Sheets-Sheet 2
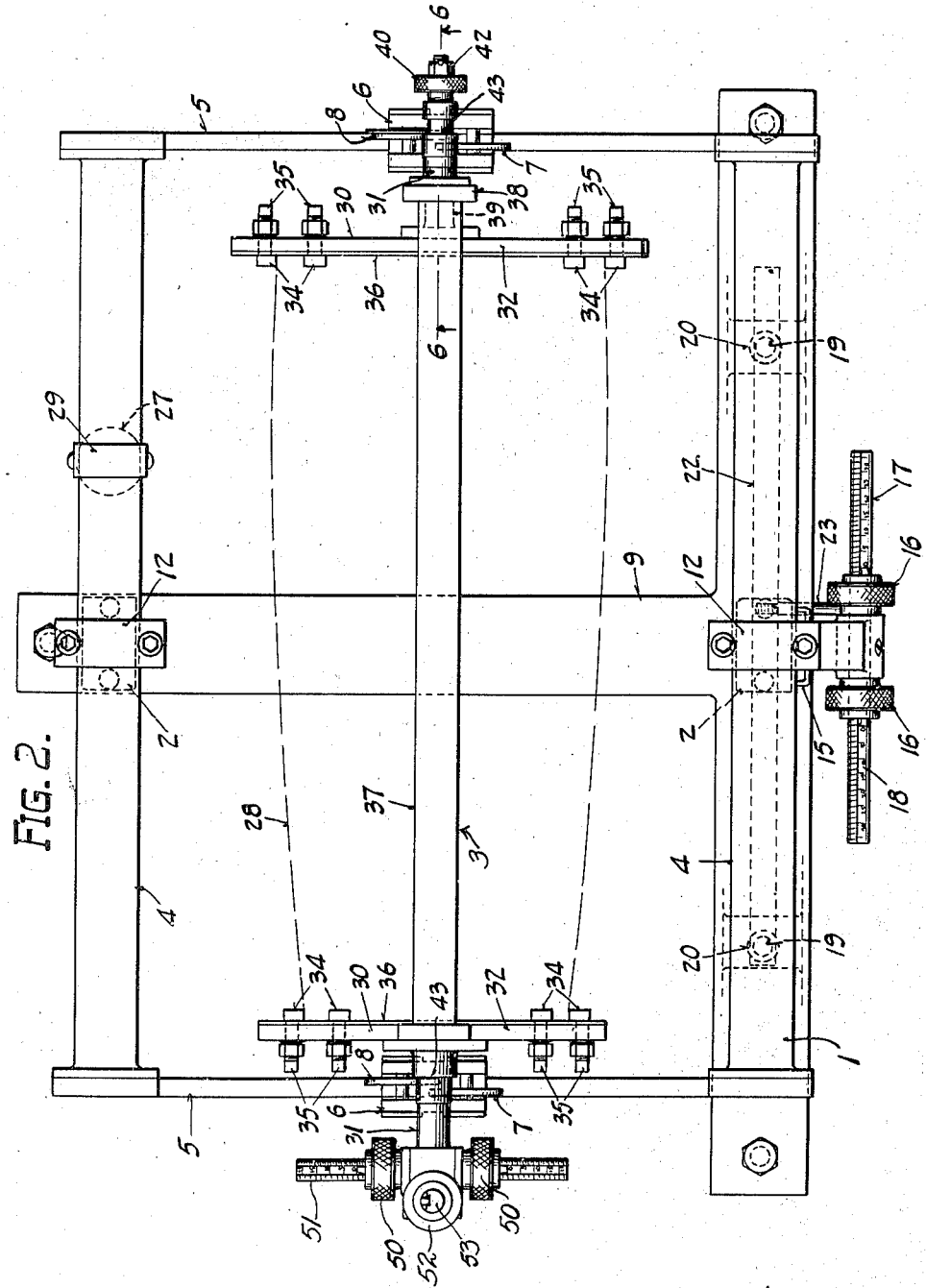
Frederick A. Gruetjen
INVENTOR.
BY
ATTORNEY.

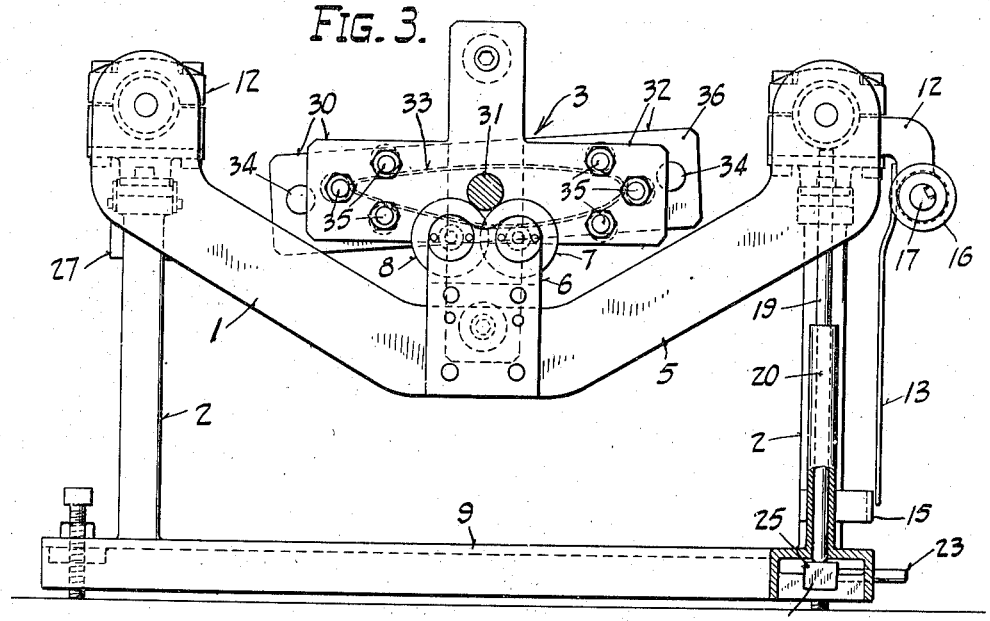
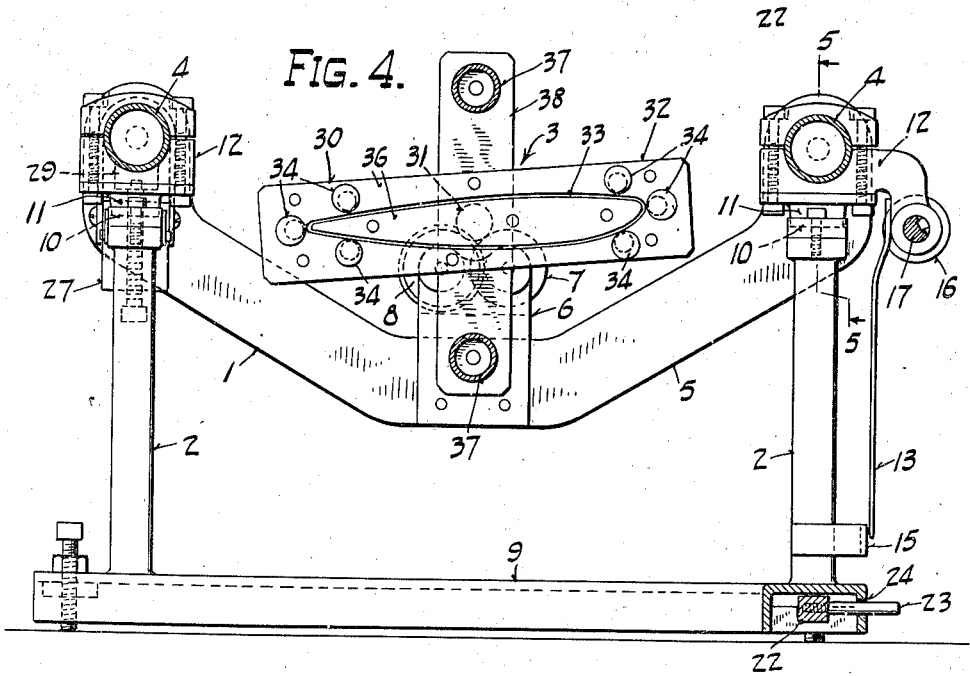

March 1, 1949.   F. A. GRUETJEN   2,463,102
STATIC BALANCE TESTING APPARATUS
Filed May 17, 1944   4 Sheets-Sheet 4
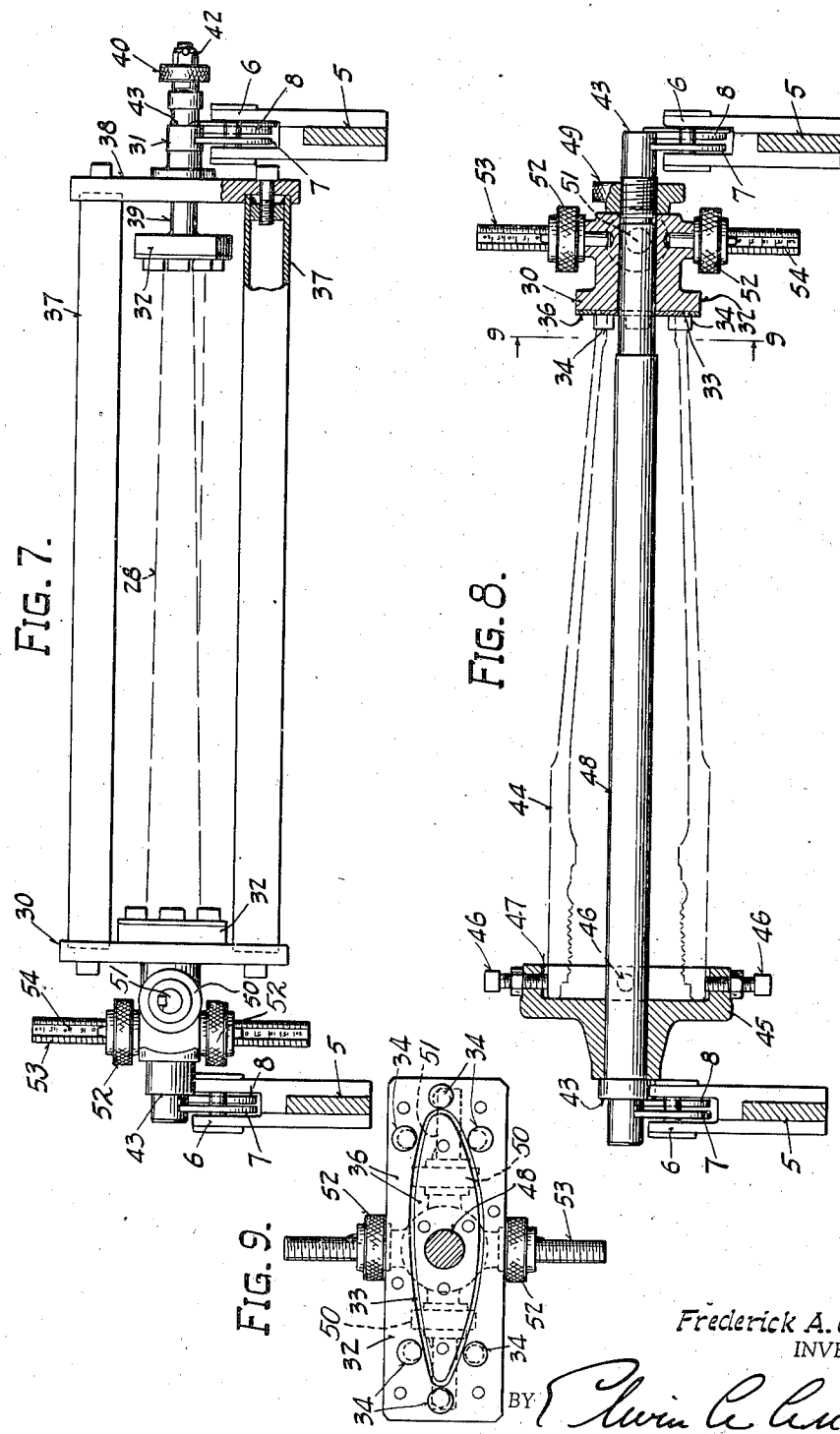
Frederick A. Gruetjen
INVENTOR.
BY
ATTORNEY.

Patented Mar. 1, 1949

2,463,102

UNITED STATES PATENT OFFICE 2,463,102

STATIC BALANCE TESTING APPARATUS

Frederick A. Gruetjen, Milwaukee, Wis., assignor to A. O. Smith Corporation, Milwaukee, Wis., a corporation of New York Application May 17, 1944, Serial No. 535,947

7 Claims. (Cl. 73—66)

This invention relates to a static balance testing apparatus for testing the balance of propeller parts and the like.

The object of the invention is to provide a cradle mounting for accurately indicating the amount of off-balance present in the part being tested.

Another object is to provide simple readily adjustable holders for the parts being balanced.

Other objects and advantages will appear hereinafter in the description of an embodiment of the invention illustrated in the accompanying drawings.

In the drawings:

Figure 1 is a front elevation of the balancer showing a central section of a propeller mounted for testing;

Fig. 2 is a top plan view of the device of Fig. 1;

Fig. 3 is an end elevation, partly in section, of the device of Fig. 1 viewed from the left;

Fig. 4 is a transverse section taken on line 4—4 of Fig. 1 and showing a face view of one of the clamp plates for holding the propeller section;

Fig. 5 is a detail sectional view of a bearing taken on line 5—5 of Fig. 4;

Fig. 6 is an enlarged longitudinal section of the clamping means taken on line 6—6 of Fig. 2;

Fig. 7 is a side elevation of a holder for the tip section of the propeller blade and shows the cradle and part of the holder in section;

Fig. 8 is a side elevation of a holder for the shank section of the propeller blade; and Fig. 9 is a transverse section taken on line 9—9 of Fig. 8 and showing the movable clamp member.

The balance comprises in general a cradle 1, a pair of vertical pedestals 2 for supporting the cradle and a work holder or clamp 3.

The cradle 1 comprises a generally rectangular frame having two tubular side members 4 and two end cross bars 5, the latter being of a shallow V-shape to constitute the cradle. A bearing block 6 is secured to the center of each cross bar 5 and contains frictionless bearings for a pair of parallel stub shafts upon which are fixed a pair of overlapping thin roller discs 7 and 8 with their respective axes of rotation spaced equally on opposite sides of the longitudinal center line of the cradle and parallel thereto to provide a support for the article to be tested.

The upright pedestals 2 are fixed to a base 9 and spaced apart to provide a direct support for the respective side members 4 of cradle 1. The top of each pedestal is provided with a transverse wide V-groove 10 in its upper surface, the grooves of the two pedestals being in accurate alignment.

The cradle has depending knife edges 11 adapted to seat in the grooves 10 and which are secured by clamps 12 to the side members 4 near the center thereof. The knife edges 11 are located as near as possible at the transverse center line of mass of the cradle 1 and a perfectly balanced section mounted therein to check the balance in a longitudinal direction by supporting the cradle for longitudinal tilting.

The levelness of the cradle when in balance on knife edges 11 is indicated by a depending pointer 13 secured to one of the clamps 12 and which cooperates with a center mark 14 on a face plate 15 secured to the lower end of the respective pedestal 2.

Adjustment of the longitudinal balance of the cradle on knife edges 11 can be made by one of two floating weights 16 threaded upon a longitudinally extending rod 17 supported by one of the clamps 12. The rod 17 has its forward side flat with a series of spaced gage marks 18 thereon for indicating the inch pounds of correction required for balancing the article. In practice when the cradle is tilted downwardly in one direction, indicating that it is heavy at that end, the weight 16 on the opposite side will be threaded toward the outer end of rod 17 until the cradle balances horizontally, as indicated by the coinciding of pointer 13 and mark 14.

The tilting of the cradle 1 on the knife edges 11 is ordinarily prevented during idleness of the apparatus and during loading and unloading and transverse balancing. For this purpose, a pair of upright rods 19 are provided directly beneath one of the side members 4 to engage the same near the opposite ends thereof. The rods 19 are vertically slidable in suitable bearings 20 on the base 9 and are actuated by wedge portions 21 of a rod 22 mounted for horizontal reciprocation in the base 9. The rod 22 may be actuated by a pin 23 secured thereto and extending through a slot 24 in the base. The slot 24 may limit the movement of rod 22 so as to position the upper level portion 25 of the wedge under the rods 19 or to position the lower level portion 26 of the wedge thereunder to respectively prevent tilting of the cradle or to permit limited tilting thereof.

A weight 27 is clamped upon one of the rods 4 of the cradle at a predetermined position to compensate for initial differences in weight of the opposite ends of cradle 1 and holder 3 and of the work piece 28 being balanced, which as illustrated comprises the center section of a propeller blade. The clamp 29 for weight 27 is constructed with a plurality of vertically spaced holes in the portion depending from rod 4 so that the weight may be secured within the clamp by screws or the like at different heights to provide for raising the weight to a level above the knife edges 11 to give added sensitivity to the balancing operations when desired. Normally, however, the weight 27 will be located at a level below that of the knife edges 11.

The work holder 3 for the center section 28 of the blade comprises end clamps 30 each of which are supported on the opposite axially aligned stub axles 31 providing a longitudinal central rotary axis for the blade section. The axles 31 rest on the discs 7 and 8 at each end of cradle 1. Each of the clamps 30 in this particular embodiment comprises a rectangular shaped plate 32 secured at its center to the respective axle 31, the size of the plate being sufficient to more than cover the respective end of section 28.

The plate 32 of the clamp is provided with a groove 33 in the form of a template defining the outline of the respective end of section 28, the groove 33 having a rectangular cross section with inside dimensions slightly less than the outside dimensions of the end of section 28 when the latter is constructed of the lowest tolerance dimensions, and with outside dimensions greater than the outside dimensions of the end of section 28 when the latter is constructed of the greatest tolerance dimensions.

The end of section 28 is clamped in position by means of eccentric buttons 34 mounted on studs 35 extending through the plate 32, at least two being provided on each side of the section to engage the section under opposed clamping pressure. The centering of the section in the clamp may be adjusted by rotation of the studs 35 and buttons 34 until the section is centered accurately relative to the groove 33. In this centering operation, the outer edge of the template groove 33 is visible and the operation may be facilitated by the use of feeler gage strips for temporary insertion in the groove on the outside of the section to measure and equalize the space between the section and the outer wall of the groove. Although groove 33 may be inscribed directly in plate 32, in order to eliminate wear, it is advisable to face the inner side of plate 32 with thin sheets 36 of hardened wear resistant material and provide groove 33 in the form of slots in sheets 36, as shown in the drawings.

The clamps 30 are held against the ends of the section 28 by the tubular spacer rods 37 which extend on either side of the section and secure the clamps in accurately spaced relation. The rods 37 at one end seat in depressions in the ends of plate 32 of clamp 30, while at the other end the rods seat in depressions in a transverse plate 38 secured to axle 31 and extending at right angles and behind the plate 32 of the respective clamp 30. The detail showing how the rods 37 are secured to the respective plates 32 and 38 is provided in Fig. 7.

At the adjustable clamping end plate 32 is secured to the inner end of an axially movable rod 39 which passes centrally through plate 38 and the stub axle 31. A hand operated collar 40 is threaded into the enlarged outer end of axle 31 and rotatably secured on rod 39 between a shoulder 41 and an outer nut 42, and serves to provide the endwise clamping pressure for plate 32 against the end of work piece 28. This construction allows variations in angular positioning of plate 32 at the adjustable clamping end relative to the position of plate 32 at the other end to accommodate blade sections having different amounts of twist.

After the section 28 has been clamped at both ends, the assembly is placed upon the cradle 1 with the smooth ends of the stub axles 31 free to rotate on and between the discs 7 and 8. For the purpose of accurately locating the assembly longitudinally of the cradle, each axle 31 has a shoulder 43 at one end for engaging the side of one of the discs 7 and 8. Disc 8 at the right side of work holder 3 has a flange which abuts against shoulder 43 and provides an end thrust bearing for axle 31. Ordinarily the ends of the section are milled to provide an accurate length for it so that it is not necessary to provide for tolerances in the length of the section.

The shank 44 of the blade is clamped as illustrated in Figs. 8 and 9. Here the heavy cylindrical end of the shank is held in a circular clamp 45 having radial threaded studs 46 for engaging and clamping the shank, the clamp 45 being recessed to receive the shank end against the bottom plate of the clamp. The flanged circular sides of the clamp 45 are spaced from the outer surface of the shank and present therewith a radial space or groove 47 to receive the shank. The centering of the shank relative to the clamp and its axle 48 is accomplished as previously described with respect to center section 28 by utilizing the groove 47 as a template and centering the shank therein by turning of studs 46. In the present instance the axle 48 extends longitudinally through the shank 44 and through the clamping plate 32 at the opposite end of section 44. A nut 49 threaded on axle 48 secures the clamp 30 and its plate 32 against the end of the blank 44. Disc 8 at the right side of work holder 3 as shown in Fig. 8 has a flange which abuts against shoulder 43 which here is the end of axle 48 to provide an end thrust bearing for the axle 48. At the left side of the work holder shoulder 43 abuts against the inner side of disc 8.

The several blade sections 28 and 44, when clamped as described and individually supported in the cradle as described, are free to rotate on discs 7 and 8, the axis of rotation being the axis of the respective axles and coinciding approximately with the designed longitudinal center line of gravity of the blade section. For the purpose of determining the amount any given section is out of balance in two horizontal directions, one taken flatwise of the blade and the other taken edgewise, a pair of weights 50 are threaded upon the opposite ends of a rod 51 secured to one of the clamps 30 and extending in the direction of the major axis of the blade section, and a similar pair of weights 52 are threaded upon the opposite ends of a rod 53 secured to the same clamp 30 and extending in the direction of the minor axis of the blade section, as shown in Fig. 9.

The threading of a weight 50 or 52 horizontally along its rod from a zero position of designed balance to a position of actual balance as measured on a gage 54 on the respective rods, similar to gage 19 on rod 17, gives the exact inch pounds of out of balance for the section of the blade being tested and the direction of the heavy side.

The apparatus can be used to check and recheck various sections of a propeller blade in a longitudinal direction and in two horizontal directions with a single clamping of the section. If desired the section balance can be corrected by removing metal from the heavy side with a sander or by other means without removing the blank from the clamps.

In each instance the designed center line of the blank is located at approximately the line of the fulcrum for the tilting movement. In the event greater sensitiveness is desired, particularly in the longitudinal balance, the weight 27 may be raised relative to the knife edges 11.

By employing end bars 5 for cradle 1 of V-shape as shown, the axis of rotation of the work holder 3 is in about the same horizontal plane as the axis for tilting of the cradle so that the center of mass is about the same for each of the balancing operations.

Various embodiments of the invention may be employed within the scope of the accompanying claims.

I claim:

1. In a static balance testing apparatus for statically determining the amount of unbalance in a propeller blade section and the like of non-circular cross-section, a work holder having end clamps for receiving and holding a blade section, an axle extending from each end clamp and adapted to support the work holder for free rotation on a longitudinal axis, adjustable abutments on said end clamps for centering the blade section relative to the axis of rotation of the work holder, a template on at least one of said end clamps to indicate when said blade section is properly centered in the work holder, and means rigidly connecting said end clamps with the blade section therebetween.

2. In a static balance testing apparatus for determining the amount of unbalance in a propeller blade section and the like, a work holder having end clamps for receiving and holding a blade section, at least one of said end clamps having a working face with a template groove therein of substantially the contour of the corresponding end of the blade section and of larger dimensions to provide for the horizontal insertion of feeler gages in the template groove between the blade section and the outer edge of the groove in centering the blade section for clamping.

3. In a static balance testing apparatus for determining the amount of unbalance in a propeller blade section and the like of non-circular cross-section, a work holder having end clamps for receiving and holding a blade section, at least one of said end clamps having a working face with a template groove therein of substantially the contour of the corresponding end of the blade section and of larger dimensions to provide for the horizontal insertion of feeler gages in the template groove between the blade section and the outer edge of the groove in centering the blade section for clamping, and a plurality of eccentrically mounted rotatable buttons on the face of said clamp adapted to be adjusted for holding the blade section in centered position relative to the groove.

4. In a static balance testing apparatus for statically determining the amount of unbalance in a propeller blade section and the like of non-circular cross-section, a work holder having end clamps for receiving and holding said blade section, a template on the face of each clamp for locating the blade section therein on a measured longitudinal center axis relative to the blade, an axle extending from each end clamp and adapted to support the work holder for free rotation on said axis, and an adjustably mounted weight on one of said clamps for determining the inch pounds out of balance of the section about said measured central axis.

5. In a static balance testing apparatus for statically determining the amount of unbalance in a propeller blade section and the like of non-circular cross-section, a work holder having end clamps for receiving and holding said blade section, a template on the face of each clamp for locating the blade section therein on a measured longitudinal center axis relative to the blade, an axle extending from each end clamp and adapted to support the work holder for free rotation on said axis, an adjustably mounted weight on one of said clamps for determining the inch pounds out of balance of the section about said measured central axis, and a similar weight for determining the inch pounds out of balance of the section when said blade section is positioned at 90° of rotation from the first position of said section.

6. In a static balance testing apparatus for statically determining the amount of unbalance in a hollow tubular propeller blade section and the like of non-circular cross-section, a work holder having end clamps for receiving and holding a blade section, a bar securing said end clamps in spaced relation with the blade section therebetween, an axle extending from each end clamp and adapted to support the work holder for free rotation on a longitudinal axis, a template on the face of at least one clamp defining the outline of a respective end of the section, and eccentrically mounted rotatable buttons on said end clamps for centering the blade section accurately relative to said template.

7. In a static balance testing apparatus for statically determining the amount of unbalance in a hollow propeller blade section and the like of non-circular cross-section, a work holder having end clamps for receiving and holding a blade section, a bar extending through said section to secure said end clamps in spaced relation with the blade section therebetween and providing the respective end portions thereof as an axle extending from each end clamp to support the work holder for free rotation on a longitudinal axis, a template on the face of at least one clamp defining the outline of a respective end of the section, and a plurality of radially adjustable members on said end clamps for centering the blade section accurately relative to said template.

FREDERICK A. GRUETJEN.

REFERENCES CITED

The following references are of record in the file of this patent:

UNITED STATES PATENTS

| Number | Name | Date |
|---|---|---|
| 609,019 | Gibbs | Aug. 16, 1898 |
| 1,082,614 | Staaf | Dec. 30, 1913 |
| 1,428,620 | Wilber | Sept. 12, 1922 |
| 1,632,018 | Ashton | June 14, 1927 |
| 1,761,945 | Van Degrift | June 3, 1930 |
| 1,763,403 | Lungdren | June 10, 1930 |
| 1,855,397 | Johnson | Apr. 26, 1932 |
| 2,122,621 | Ohly | July 5, 1938 |
| 2,203,782 | Hem | June 11, 1940 |
| 2,214,758 | Bell | Sept. 17, 1940 |

FOREIGN PATENTS

| Number | Country | Date |
|---|---|---|
| 19,800 | Great Britain | 1913 |
| 245,305 | Great Britain | Jan. 7, 1926 |
| 387,093 | Germany | Dec. 21, 1923 |
| 420,043 | Germany | Oct. 15, 1925 |
| 511,975 | Great Britain | Aug. 28, 1939 |
| 540,906 | Germany | Jan. 4, 1932 |
| 683,451 | Germany | Nov. 7, 1939 |
| 679,090 | France | Jan. 5, 1930 |